US012706939B2

(12) United States Patent
Kulshreshtha et al.

(10) Patent No.: US 12,706,939 B2
(45) Date of Patent: Aug. 11, 2026

(54) PRIORITIZING VULNERABILITY BASED ON APPLICATION SECURITY CONTEXT

(71) Applicant: Cisco Technology, Inc., San Jose, CA (US)

(72) Inventors: Ashutosh Kulshreshtha, Cupertino, CA (US); Walter T. Hulick, Jr., Pearland, TX (US); Dhruv Hitesh Raithatha, San Francisco, CA (US); Randall Edgar Birdsall, Laurel, MD (US)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 18/151,827

(22) Filed: Jan. 9, 2023

(65) Prior Publication Data

US 2023/0254336 A1 Aug. 10, 2023

Related U.S. Application Data

(60) Provisional application No. 63/308,683, filed on Feb. 10, 2022.

(51) Int. Cl.
*H04L 9/40* (2022.01)

(52) U.S. Cl.
CPC ...... *H04L 63/1433* (2013.01); *H04L 63/1416* (2013.01)

(58) Field of Classification Search
CPC ........................ H04L 63/1416; H04L 63/1433
See application file for complete search history.

(56) References Cited

U.S. PATENT DOCUMENTS 11,200,324 B1 * 12/2021 Manral ................. G06F 21/629
2007/0034682 A1 * 2/2007 Williams ............... G06Q 20/40 235/379
2009/0089869 A1 * 4/2009 Varghese ............. G07F 7/1008 726/7
2010/0192228 A1 7/2010 Levi
2012/0259793 A1 * 10/2012 Umansky ............... G06Q 10/06 705/348

(Continued)

OTHER PUBLICATIONS

PCT Notification of Transmittal of the Intl. Search Report and the Written Opinion of the Intl. Searching Authority, or the Declaration, re. Intl Appl. PCT/US2023/062016 mailed May 15, 2023.

(Continued)

*Primary Examiner* — Daniel B Potratz
*Assistant Examiner* — Matthias Habtegeorgis
(74) *Attorney, Agent, or Firm* — Baker Botts L.L.P.

(57) ABSTRACT

According to some embodiments, a method includes determining a plurality of business transactions for a plurality of services provided by an application. The method further includes calculating a vulnerability score for each determined business transaction. Each vulnerability score is based on one or more application context factors of a plurality of application context factors. The method further includes displaying a graphical user interface. The graphical user interface includes a list of the determined business transactions and the calculated vulnerability score for each determined business transaction in the list.

20 Claims, 3 Drawing Sheets

(56) References Cited

U.S. PATENT DOCUMENTS

2013/0325696 A1* 12/2013 Graves .................. G06Q 30/00 705/39
2014/0122305 A1* 5/2014 Cherry ................ G06Q 20/405 705/30
2014/0137257 A1 5/2014 Martinez et al.
2014/0173738 A1* 6/2014 Condry ................ G06F 21/577 726/25
2014/0279500 A1* 9/2014 Larko ................. G06Q 30/016 705/44
2015/0006271 A1* 1/2015 Oppenheim ......... G06Q 20/387 705/14.23
2016/0119373 A1 4/2016 Fausto et al.
2016/0267580 A1* 9/2016 Unser .................. G06Q 40/00
2016/0373478 A1* 12/2016 Doubleday ............... G06F 8/65
2017/0078322 A1* 3/2017 Seiver ................ H04L 63/1433
2017/0244740 A1* 8/2017 Mahabir ............ H04L 63/1433
2017/0353482 A1* 12/2017 Sommer ............ H04L 63/1433
2018/0077193 A1 3/2018 Roytman et al.
2018/0234411 A1* 8/2018 Masiero .............. H04L 63/0853
2018/0309752 A1* 10/2018 Villavicencio ...... H04L 63/1433
2018/0309778 A1* 10/2018 Sugarbaker ............ H04L 43/08
2019/0236282 A1 8/2019 Hulick, Jr.
2020/0366682 A1* 11/2020 Aggarwal ............ H04L 63/105
2020/0401701 A1 12/2020 Canada
2021/0194883 A1 6/2021 Badhwar
2021/0218765 A1* 7/2021 Rodriguez Bravo ........................ H04L 63/1433
2021/0374250 A1 12/2021 Inagaki et al.
2022/0103592 A1* 3/2022 Semel ..................... H04L 63/20
2023/0205891 A1* 6/2023 Yellapragada ...... H04L 63/1416 726/25

OTHER PUBLICATIONS

Mark Curphey Joel Scambray et al., "Improving Web Application Security: Threats and Countermeasures," Jan. 1, 2003, URL:http://www.cgisecurity.com/lib/Threats_Countermeasures.pdf, pp. 102, 117.

Office Action for Indian Application No. 202417067864, dated Dec. 29, 2025, 6 Pages.

Office Action for Canada Application No. 3251663, dated May 1, 2026, 6 Pages.

* cited by examiner

PRIORITIZING VULNERABILITY BASED ON APPLICATION SECURITY CONTEXT

PRIORITY

This application claims the benefit, under 35 U.S.C. § 119(e), of U.S. Provisional Patent Application No. 63/308,683, filed 10 Feb. 2022, which is incorporated herein by reference in its entirety.

TECHNICAL FIELD

This disclosure generally relates to computer security, and more specifically to prioritizing vulnerability based on application security.

BACKGROUND

Detection and assessing vulnerabilities in Information Technology (IT) systems and applications is an important process. For example, cataloging various software (e.g., open-source software) used throughout the code base of an application and detecting any known vulnerabilities in the software is a typical task performed in order to assess the overall vulnerability of the application. A typical tool used to assess the vulnerabilities of an application is known as a vulnerability scanning tool. Most vulnerability scanning tools are limited in their ability to report the true vulnerability of an application.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

Figure 1:
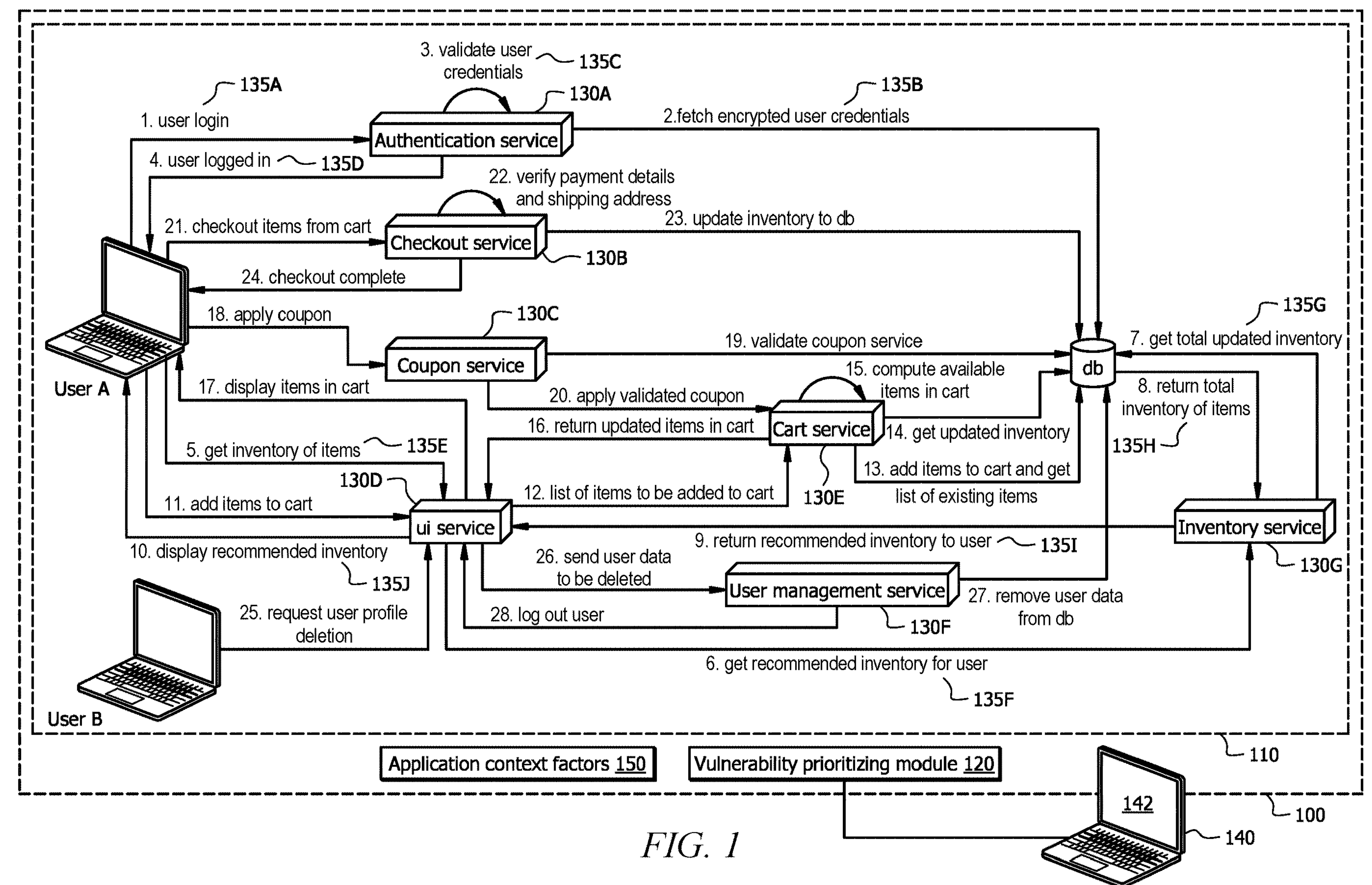
FIG. 1 is a diagram illustrating a vulnerability prioritization system, according to some embodiments.

The present disclosure relates generally to systems and methods for automatically assessing and prioritizing vulnerabilities on a business transaction basis. As used herein, a business transaction represents the end-to-end, cross-tier processing path used to fulfill a request for a service provided by an application. The disclosed embodiments calculate and display a vulnerability score for business transactions that are discovered within an application. The vulnerability score calculated for each business transaction is based on environmental factors that typical vulnerability scanning tools overlook. These environmental factors, also referred to herein as application context factors, provide modified vulnerability scores with more useful information than a typical vulnerability score (e.g., Common Vulnerability Scoring System (CVSS) scores) in assessing a potential threat. The modified vulnerability scores calculated by the disclosed embodiments provide security operators the ability to truly visualize and prioritize the security risks associated with an application.

According to some embodiments, a system includes one or more memory units and one or more computer processors communicatively coupled to the one or more memory units. The one or more computer processors are configured to access a plurality of application context factors stored in the one or more memory units. The one or more computer processors are further configured to determine a plurality of business transactions for a plurality of services provided by an application. The one or more computer processors are further configured to calculate a vulnerability score for each determined business transaction. Each vulnerability score is based on one or more application context factors of the plurality of application context factors. The one or more computer processors are further configured to display a graphical user interface comprising a list of the determined business transactions and the calculated vulnerability score for each determined business transaction in the list.

According to another embodiment, a method includes determining a plurality of business transactions for a plurality of services provided by an application. The method further includes calculating a vulnerability score for each determined business transaction. Each vulnerability score is based on one or more application context factors of a plurality of application context factors. The method further includes displaying a graphical user interface. The graphical user interface includes a list of the determined business transactions and the calculated vulnerability score for each determined business transaction in the list.

Technical advantages of certain embodiments of this disclosure may include one or more of the following. Certain systems and methods described provide systems and methods for prioritizing vulnerabilities based on application security context. Unlike existing typical vulnerability scanning tools, embodiments of this disclosure provide systems and methods that automatically discover business transactions and then calculate a vulnerability score for each business transaction that is based on application context factors. By calculating and displaying vulnerability scores for business transactions that take into account application context factors, the disclosed embodiments provide security personnel the ability to more quickly and accurately identify security threats within an application. This may ultimately reduce and optimize network bandwidth and computer resources (e.g., computer memory and processing power) by allowing security threats to be identified and corrected before any malicious actions occur. Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The present disclosure relates generally to systems and methods for prioritizing vulnerabilities based on application security context. A business transaction represents the end-to-end, cross-tier processing path used to fulfill a request for a service provided by an application. The disclosed embodiments calculate and display a vulnerability score for business transactions that are discovered within an application. The vulnerability score calculated for each business transaction is based on environmental factors that typical vulnerability scanning tools overlook. These environmental factors, also referred to herein as application context factors, provide modified vulnerability scores with more useful information than a typical vulnerability score (e.g., Common Vulnerability Scoring System (CVSS) scores) in assessing a potential threat. The modified vulnerability scores calculated by the disclosed embodiments provide security operators the ability to truly visualize and prioritize the security risks associated with an application.

Figure 2:
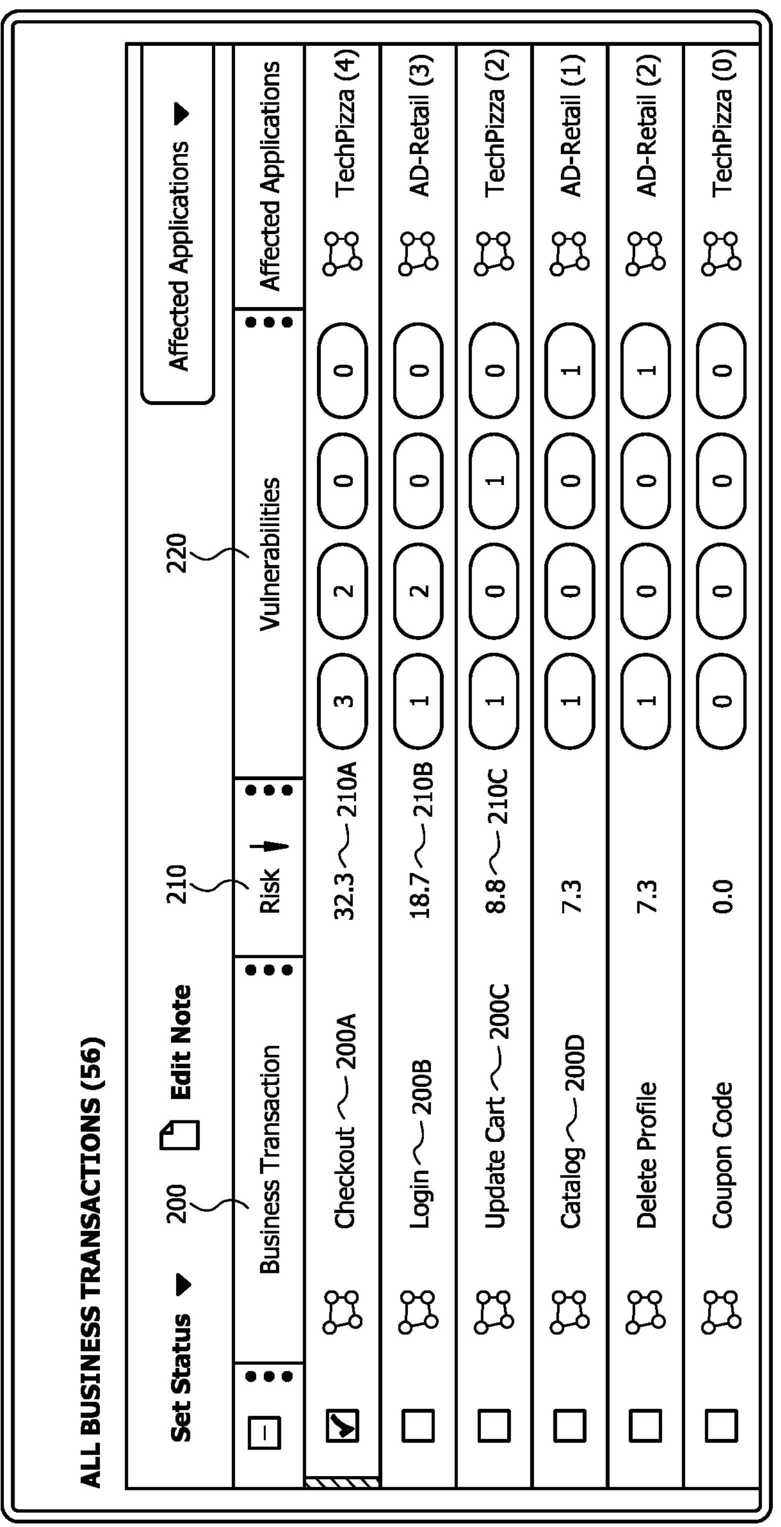
FIG. 2 is a diagram illustrating a graphical user interface for prioritizing vulnerabilities based on application security context, according to some embodiments.

FIG. 1 is a diagram illustrating a vulnerability prioritizing system 100, according to certain embodiments. Vulnerability prioritizing system 100 may be implemented using one or more computer systems, such as the computer system described in reference to FIG. 4 below. Vulnerability prioritizing system 100 includes a software application 110, a vulnerability prioritization module 120, services 130 (e.g., 130A-130G), transactions 135 (e.g., 135A-135J), and a user device 140. Application 110, vulnerability prioritization module 120, and application context factors 150 may be stored in any appropriate memory unit. User device 140 displays a graphical user interface 142. An example of graphical user interface 142 is shown in FIG. 2.

In general, vulnerability prioritizing system 100 automatically calculates and displays a vulnerability score (e.g., vulnerability score 210) for business transactions 200 that are discovered within application 110. The vulnerability score 210 calculated for each business transaction is based on environmental factors that typical vulnerability scanning tools overlook. To provide the improved vulnerability scores for business transactions, certain embodiments first determine business transactions 200 for services 130 provided by application 110. Example business transactions 200 are shown in FIG. 2 and discussed in more detail below. After determining business transactions 200, certain embodiments then calculate a vulnerability score 210 for each determined business transaction 200. Each vulnerability score 210 is based on one or more application context factors 150. Example vulnerability scores 210 are shown in FIG. 2 and discussed in more detail below. After calculating vulnerability scores 210, certain embodiments then display graphical user interface 142 that includes a list of the determined business transactions 200 and the calculated vulnerability score 210 for each determined business transaction 200 in the list. An example graphical user interface 142 is illustrated in FIG. 2. As a result, security operators are provided the ability to truly visualize and prioritize the security risks associated with an application.

Vulnerability prioritizing system 100 may be any appropriate computing system in any suitable physical form. As example and not by way of limitation, vulnerability prioritizing system 100 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, vulnerability prioritizing system 100 may include one or more computer systems; be unitary or distributed; span multiple locations; span multiple machines; span multiple data centers; or reside in a cloud, which may include one or more cloud components in one or more networks. Where appropriate, vulnerability prioritizing system 100 may perform without substantial spatial or temporal limitation one or more steps of one or more methods described or illustrated herein. As an example and not by way of limitation, vulnerability prioritizing system 100 may perform in real time or in batch mode one or more steps of one or more methods described or illustrated herein. Vulnerability prioritizing system 100 may perform at different times or at different locations one or more steps of one or more methods described or illustrated herein, where appropriate. A particular example of vulnerability prioritizing system 100 is described in reference to FIG. 4.

Application 110 is any software program that provides information or a service to one or more users such as User A and User B. Application 110 may utilize any number of services 130 (e.g., microservices) to provide information to users. For example, application 110 may utilize an authentication service 130A, a checkout service 130B, a coupon service 130C, a user interface (UI) service 130D, a cart service 130E, a user management service 130F, and an inventory service 130G when providing a purchase interface to USER A (e.g., via a website). Services 130 may each be independent code or have an overlapping and shared code base with other services 110. In general, the structuring of services 130 occurs around a particular business capability.

Vulnerability prioritization module 120 is a software program or module that provides improved vulnerability scores for business transactions 200 to graphical user interface 142 on user device 140. In some embodiments, vulnerability prioritization module 120 is stored on the same computer system as application 110. In other embodiments, vulnerability prioritization module 120 is stored on a separate computer system from application 110.

User device 140 is any appropriate device for communicating with components of vulnerability prioritizing system 100 over a communications network (e.g., the internet). For example, user device 140 may be a handheld computing device such as a smartphone, wearable computer glasses, a smartwatch, a tablet computer, a laptop computer, a desktop computer, and the like. User device 140 may include an electronic display, a processor such processor 402, and memory such as memory 404.

The electronic display of user device 140 may display user interface 142 that displays business transactions 200 and their respective vulnerabilities 220. In some embodiments, user interface 142 may include one or more user-selectable options that permit the user to provide application context factors 150. An example of graphical user interface 142 is illustrated in FIG. 2.

Application context factors 150 are environmental factors that are used to calculate vulnerability scores 210. In general, application context factors 150 are factors inherent to the application context such as version, application server type, existing Common Vulnerabilities and Exposures (CVEs) filed, whether a security manager is enabled, etc. Essentially, application context factors 150 are valid and relevant factors when considering the current risk level around business transaction security for mission critical applications. Traditionally, when scoring vulnerabilities in an application, known vulnerabilities in the constituent libraries that make up the application are identified. This is a good start to calculating the risk of an application, but it ignore issues that are outside the application that can make an application and its vulnerabilities more critical than a different application that has the exact same composition. Application context factors 150 are those things external and internal outside of its constituents that can help correctly prioritize which vulnerabilities to fix first. In some embodiments, application context factors 150 are input by a user using graphical user interface 142. Some examples of application context factors 150 include:

- whether application 110 is Internet facing
- a quantity of server ports open to read
- a sensitivity of the particular business transaction 200
- a value of data being stored
- a significance of the application to a business
- a number of admin users
- whether a firewall is present
- an encryption method used
- whether disk encryption is used
- how heavily the application is used
- an amount of revenue the application is generating
- a type of the application (internal vs. public facing)
- whether sensitive data is being carried (e.g., PII, health data, etc.)
- whether any mitigating controls are placed outside of application 110 that reduce the risk of exploitation
- whether the application runtime behavior changed (e.g., new hosts application 210 is talking to, new files application 210 opened, etc.)

In some embodiments, each application context factor 150 includes an associated points value. For example, the factor "whether disk encryption is used" may have a points value of "1". As another example, the factor "a number of admin users" may have a points value of "2". In general, application context factors 150 are used to calculate vulnerability scores 210, as discussed in more detail below.

In operation and in reference to FIG. 1 and FIG. 2, vulnerability prioritizing system 100 automatically calculates and displays a vulnerability score (e.g., vulnerability score 210) for business transactions 200 that are discovered within application 110. The vulnerability score 210 calculated for each business transaction 200 is based on environmental factors that typical vulnerability scanning tools overlook. To provide the improved vulnerability scores 210 for business transactions 200, certain embodiments first determine business transactions 200 for services 130 provided by application 110. In general, a business transactions 200 is a processing path used to fulfill a request for a particular service 130 provided by application 110. Some embodiments can automatically discover business transactions 200, both known and unknown, to construct a detailed topology map of how traffic flows within an application (e.g., FIG. 1). For example, the following business transactions 200 of FIG. 1 may be discovered by vulnerability prioritization module 120:

- User Login (Steps #1-#4)
- Catalog Inventory (Steps #5-#10)
- Update Cart (Steps #11-#17)
- Coupon Apply (Steps #18-#20)
- Checkout (Steps #21-#24)
- User Deletion (Steps #25-#28)

In some embodiments, business transactions 200 are discovered automatically by vulnerability prioritization module 120. For example, every transaction may have a transaction identification and a business transaction identification. The business transaction identification may originate in the tier where the transaction 135 first starts to fulfill a business capability and the business transaction identification travels as a header with the subsequent requests made across the tiers of the application to fulfil the business capability. Each request in a new tier may create a new transaction 135 with a different transaction identification yet have the same business transaction identification. The controller that records this information may correlate various transactions 135 that happen across different tiers because of the common business transaction identification. This may allow the identification of the data flow that constitute a business transaction 200.

After determining business transactions 200, certain embodiments then calculate a vulnerability score 210 for each determined business transaction 200. Each vulnerability score 200 is based on one or more application context factor 150. In order to calculate vulnerability score 210, some embodiments first calculate a context score using the one or more application context factors. For example, consider the scenario where the factor "whether application 110 is Internet facing" has been evaluated by vulnerability prioritization module 120 and applied to a particular business transactions 200. If the factor "whether application 110 is Internet facing" has been found to be true and has an associated points value of "3," the context score may be calculated as being 3. Next, vulnerability prioritizing system 100 determines a CVSS score for services 130 touched by the business transactions 200. For example, the CVSS for the lone service 130 touched by the business transaction 200 may be found to be 5. Finally, vulnerability prioritizing system 100 calculates the vulnerability score 210 using the context score and the CVSS score. In this scenario, the vulnerability score 210 may be found to be 8 (context score of 3 plus CVSS score of 5).

In some embodiments, each application context factor 150 has an associated weight and an associated time for when the weight gets applied. The weights may be dynamically altered with an evolving machine learning model that categorizes how to weight different factors based on how likely it makes the application more vulnerable to exploitation. To illustrate this, consider a scenario where two applications, A1 and A2, each have a multi-tiered architecture and use the same set of libraries which results in a score without the application context of 100. Vulnerability prioritizing system 100 then adds the application and the business context to the mix in order to calculate new vulnerability scores 210. TABLE 1 below illustrates example application context factors 150 and their associated weights for applications A1 and A2:

TABLE 1

| Application Context Factor 150 | Weight | Application A1 context | Application A2 context |
|---|---|---|---|
| Is the application external facing? | 0.4 | Yes | Yes |
| Is a tier in the application talking to a database? | 0.5 | Yes | No |
| Is the application carrying sensitive data? | 0.5 | Yes | No |
| Is the application showing anomalous runtime behavior? | 0.4 | No | No |
| Does the application have a vulnerability that can be remotely exploited? | 0.4 | No | Yes |
| Is a known vulnerable method touched in serving the application's request? | 0.4 | Yes | No |
| Can the vulnerable method usage cause the remote code exploitation? | 0.9 | No | Yes |
| Is the application serving or talking to an IP address that is | 1 | No | Yes |

TABLE 1-continued

| Application Context Factor 150 | Weight | Application A1 context | Application A2 context |
|---|---|---|---|
| publicly identified as malicious? | | | |
| Are there any mitigating controls placed to reduce the risk of a vulnerability being exploited? | −0.5 | Yes | No |

Using the above example application context factors 150 and weights, the vulnerability scores 210 for applications A1 and A2 may be calculated as follows:

A1=100+(1*100*0.4)+(1*100*0.5)+(1*100*0.5)+(0*100*0.4)+(0*100*0.4)+(1*100*0.4)+(0*100*0.9)+(0*100*1)+(1*100*−0.5)=230

A2=A1=100+(1*100*0.4)+(0*100*0.5)+(0*100*0.5)+(0*100*0.4)+(1*100*0.4)+(0*100*0.4)+(1*100*0.9)+(1*100*1)+(0*100*-0.5)=370

Based on the application context, even when both applications A1 and A2 had the same initial score of 100, the vulnerability score 210 of A2 is higher than that of A1 (370 vs. 230) when application context factors 150 are analyzed. Thus, the vulnerabilities for A2 need to be prioritized first to effectively reduce the risk for the organization.

In some embodiments, the vulnerability score 210 associated with a business transaction 200 is a combination of the weighted average of the number of transactions 135 in the business transaction 200 multiplied by the total CVSS score of vulnerabilities in the business transaction 200. For example, consider a scenario where a business transaction 200 hits three services 130 that have CVSS scores of 10, 8, and 6, respectively. Additionally, vulnerability prioritizing system 100 determines that there are 1000 transactions that occur every second in this application 110 and 200 of them have the same business transaction 200. Then the vulnerability score 210 for the business transaction 200 is calculated as (transactions per sec/total transactions per second) *(Total CVSS Score)=(200/1000)*(10+8+6)=4.8.

In some embodiments, vulnerability prioritizing system 100 determines vulnerability counts 220 for each business transaction 200. In some embodiments, vulnerability counts 220 are identified by detecting all vulnerabilities present in the individual services 130 that are touched by the business transaction 200. To use the last example where a business transaction 200 hits three services 130 that have CVSS scores of 10, 8, and 6, respectively, the three vulnerabilities that get detected may be categorized as Critical/High/Medium/Low impact via the CVSS score. For example, any CVSS score under 1 may be categorized as "Low" impact, a score between 2-5 may be categorized as "Medium" impact, a score between 6-10 may be categorized as "High" impact, and a score over 10 may be categorized as "Critical" impact. The vulnerability counts 220 may then be displayed in graphical user interface 142. Using FIG. 2, for example, business transaction 200A has three Critical and two High vulnerabilities, business transaction 200C has one Medium vulnerability, and business transaction 200D has one Low vulnerability.

After calculating vulnerability scores 210, certain embodiments then display graphical user interface 142 that includes a list of the determined business transactions 200 and the calculated vulnerability score 210 for each determined business transaction 200 in the list. An example graphical user interface 142 is illustrated in FIG. 2. As a result, security operators are provided the ability to truly visualize and prioritize the security risks associated with an application.

Figure 3:
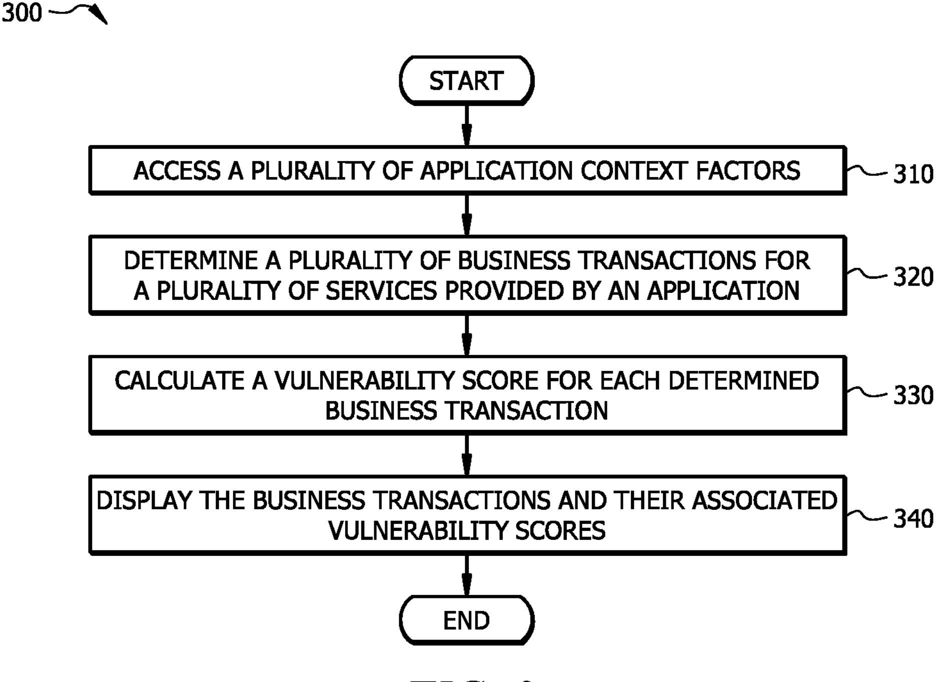
FIG. 3 is a flow diagram illustrating an example method for prioritizing vulnerabilities based on application security context, according to some embodiments.

FIG. 3 is a flow diagram illustrating an example method 300 for prioritizing vulnerabilities based on application security context. In some embodiments, method 300 may be performed by any appropriate computer system. Method 300 may begin in step 310 where a plurality of application context factors that stored in the one or more memory units are accessed. In some embodiments, the plurality of application context factors are application context factors 150. In some embodiments, the plurality of application context factors are input by a user using a graphical user interface.

In step 320, method 300 determines a plurality of business transactions for a plurality of services provided by an application. Each business transaction is a processing path used to fulfill a request for a particular service of the plurality of services provided by the application. In some embodiments, the business transactions are business transactions 200. In some embodiments, the services are services 130. In some embodiments, the application is application 110. In some embodiments, the plurality of business transactions are determined automatically in real time.

In step 330, method 300 calculates a vulnerability score for each determined business transaction. Each vulnerability score is based on one or more of the application context factors of step 310. In some embodiments, step 330 includes calculating a context score using the one or more application context factors, determining a CVSS score, and calculating the vulnerability score using the context score and the CVSS score.

In step 340, method 300 displays a graphical user interface. In some embodiments, the graphical user interface is graphical user interface 142. In some embodiments, the graphical user interface includes a list of the determined business transactions and the calculated vulnerability score for each determined business transaction in the list. After step 340, method 300 may end.

Figure 4:
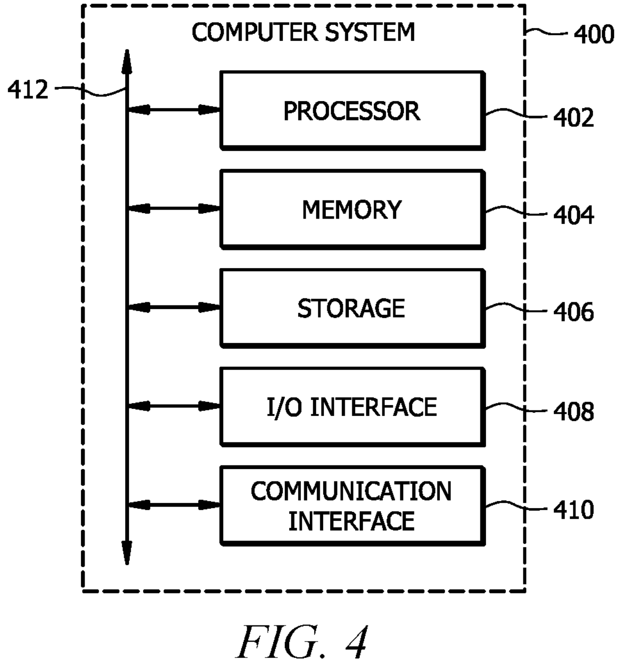
FIG. 4 is an example computer system that can be utilized to implement aspects of the various technologies presented herein, according to some embodiments.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. An apparatus comprising:

one or more memory units; and one or more computer processors communicatively coupled to the one or more memory units and configured to:

access a plurality of application context factors stored in the one or more memory units, wherein the plurality of application context factors is associated with a plurality of weights, respectively;

determine a plurality of business transactions for a plurality of services provided by an application;

determine a subset of the plurality of application context factors applicable to each of the plurality of business transactions;

determine a further subset of the plurality of application context factors dependent on a status of the application, wherein the subset of the plurality of application context factors dynamically change according to a state of the application;

determine, based on the further subset of the plurality of application context factors, an associated subset of the plurality of weights for each of the plurality of business transactions;

calculate a vulnerability score for each of the plurality of business transactions using the respective subset of the plurality of weights; and display a graphical user interface comprising:

an ordered list of the plurality of business transactions, where the plurality of business transactions is listed in descending order based on each business transaction's respective calculated vulnerability score; and the vulnerability score for each of the plurality of business transactions in the ordered list.

2. The apparatus of claim 1, wherein each of the plurality of business transactions is a processing path used to fulfill a request for a particular service of the plurality of services provided by the application.

3. The apparatus of claim 1, wherein the plurality of application context factors are input using the graphical user interface.

4. The apparatus of claim 1, wherein the plurality of business transactions are determined automatically in real time.

5. The apparatus of claim 1, wherein the plurality of application context factors comprises:

whether the application is Internet facing;

a quantity of server ports open to read;

a sensitivity of each of the plurality of business transactions;

a value of data being stored;

a significance of the application to a business;

a number of admin users;

whether a firewall is present;

an encryption method used;

whether disk encryption is used;

how heavily the application is used;

an amount of revenue the application is generating; and whether an application runtime behavior has changed.

6. The apparatus of claim 1, wherein calculating the vulnerability score for each of the plurality of business transactions comprises:

calculating a context score using one or more of the plurality of application context factors;

determining a Common Vulnerability Scoring System (CVSS) score; and calculating the vulnerability score using the context score and the CVSS score.

7. The apparatus of claim 1, wherein determining the plurality of business transactions comprises analyzing a plurality of transaction identifications and a plurality of business transaction identifications associated with a plurality of transactions.

8. A method by a computing system, the method comprising:

Determining a plurality of business transactions for a plurality of services provided by an application;

determining a plurality of application context factors, wherein the plurality of application context factors is associated with a plurality of weights, respectively;

determining a subset of the plurality of application context factors applicable to each of the plurality of business transactions;

determining a further subset of the plurality of application context factors dependent on a status of the application, wherein the subset of the plurality of application context factors dynamically change according to a state of the application;

determining, based on the further subset of the plurality of application context factors, an associated subset of the plurality of weights for each of the plurality of business transactions;

calculating a vulnerability score for each of the plurality of business transactions using the respective subset of the plurality of weights; and displaying a graphical user interface comprising:

an ordered list of the plurality of business transactions, where the plurality of business transactions is listed in descending order based on each business transaction's respective calculated vulnerability score; and the vulnerability score for each of the plurality of business transactions in the ordered list.

9. The method of claim 8, wherein each of the plurality of business transactions is a processing path used to fulfill a request for a particular service of the plurality of services provided by the application.

10. The method of claim 8, wherein the plurality of application context factors is input using the graphical user interface.

11. The method of claim 8, wherein the plurality of business transactions is determined automatically in real time.

12. The method of claim 8, wherein the plurality of application context factors comprises:

whether the application is Internet facing;

a quantity of server ports open to read;

a sensitivity of each of the plurality of business transactions;

a value of data being stored;

a significance of the application to a business;

a number of admin users;

whether a firewall is present;

an encryption method used;

whether disk encryption is used;

how heavily the application is used;

an amount of revenue the application is generating; and whether an application runtime behavior has changed.

13. The method of claim 8, wherein calculating the vulnerability score for each of the plurality of business transactions comprises:

calculating a context score using one or more of the plurality of application context factors;

determining a Common Vulnerability Scoring System (CVSS) score; and calculating the vulnerability score using the context score and the CVSS score.

14. The method of claim 8, wherein determining the plurality of business transactions comprises analyzing a plurality of transaction identifications and a plurality of business transaction identifications associated with a plurality of transactions.

15. One or more computer-readable non-transitory storage media embodying instructions that, when executed by a processor, cause the processor to perform operations comprising:

determining a plurality of business transactions for a plurality of services provided by an application;

determining a plurality of application context factors, wherein the plurality of application context factors is associated with a plurality of weights, respectively;

determining a subset of the plurality of application context factors applicable to each of the plurality of business transactions;

determine a further subset of the plurality of application context factors dependent on a status of the application, wherein the subset of the plurality of application context factors dynamically change according to a state of the application;

determining, based on the further subset of the plurality of application context factors, an associated subset of the plurality of weights for each of the plurality of business transactions;

calculating a vulnerability score for each of the plurality of business transactions using the respective subset of the plurality of weights; and displaying a graphical user interface comprising:

an ordered list of the plurality of business transactions, where the plurality of business transactions is listed in descending order based on each business transaction's respective calculated vulnerability score; and the vulnerability score for each of the plurality of business transactions in the ordered list.

16. The one or more computer-readable non-transitory storage media of claim 15, wherein each of the plurality of business transactions is a processing path used to fulfill a request for a particular service of the plurality of services provided by the application.

17. The one or more computer-readable non-transitory storage media of claim 15, wherein the plurality of application context factors is input using the graphical user interface.

18. The one or more computer-readable non-transitory storage media of claim 15, wherein the plurality of business transactions is determined automatically in real time.

19. The one or more computer-readable non-transitory storage claim 15, wherein the plurality of application context factors comprises:

whether the application is Internet facing;

a quantity of server ports open to read;

a sensitivity of each of the plurality of business transactions;

a value of data being stored;

a significance of the application to a business;

a number of admin users;

whether a firewall is present;

an encryption method used;

whether disk encryption is used;

how heavily the application is used;

an amount of revenue the application is generating; and whether an application runtime behavior has changed.

20. The one or more computer-readable non-transitory storage media of claim 15, wherein calculating the vulnerability score for each of the plurality of business transactions comprises:

calculating a context score using one or more of the plurality of application context factors;

determining a Common Vulnerability Scoring System (CVSS) score; and calculating the vulnerability score using the context score and the CVSS score.

* * * * *